R. G. McCOSKRIE.
SLEEVE SUPPORT FOR COIL SPRINGS.
APPLICATION FILED NOV. 17, 1921.

1,411,049.

Patented Mar. 28, 1922.

Inventor:
R. G. McCoskrie
By E. B. McBath
Attorney

UNITED STATES PATENT OFFICE.

REUBEN G. McCOSKRIE, OF GOODLAND, KANSAS.

SLEEVE SUPPORT FOR COIL SPRINGS.

1,411,049.  Specification of Letters Patent.  Patented Mar. 28, 1922.

Application filed November 17, 1921. Serial No. 515,906.

*To all whom it may concern:*

Be it known that I, REUBEN G. McCOSKRIE, a citizen of the United States, and a resident of Goodland, in the county of Sherman and the State of Kansas, have invented certain new and useful Improvements in Sleeve Supports for Coil Springs, of which the following is a specification.

This invention is an improvement upon the anti-rattling device shown and described in my Patent Number 1,398,105, Nov. 22, 1921.

I have found by tests that while that device secured complete absence of noise and rattle after an automobile had been run with it in place for one thousand miles the coil spring tended to mark the push rod and to wear off the corners of a lock nut. This invention relates to a sleeve support for the spring which encloses the nut and holds the spring out of contact at the lower end with the valve operating rod.

Figure 1:
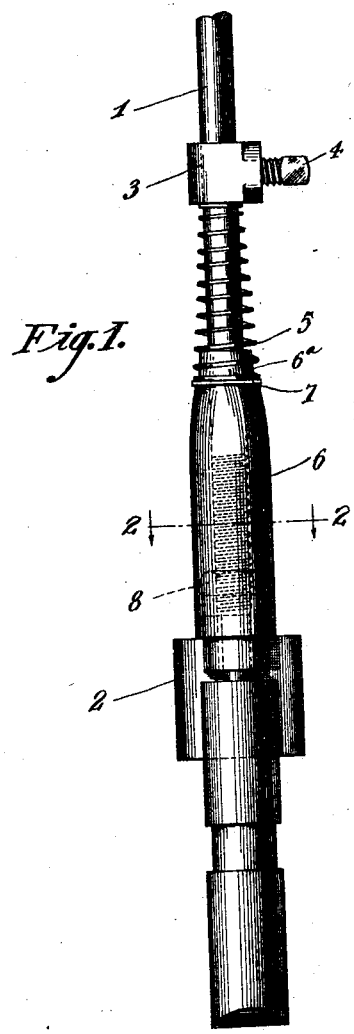
Figure 1 is a side elevation.
Figure 2:
Figure 2 is a section on the line 2—2 of Fig. 1.

In the drawing 1 designates the push rod for the engine valves, but one rod being shown, and 2 is the valve lifter lock, both of these parts being now in common use.

A collar 3 is locked to the push rod by a set screw 4 against which the upper end of a coil spring 5 bears. Between the valve lifter lock and the spring I insert my present device. This consists of a bottle-shaped sleeve 6 which will preferably be formed of aluminum, and which has an upper contracted neck portion 6ª and an annular bead 7, forming a seat for the spring. This sleeve takes up all wear and as it encloses the lock nut 8, shown in dotted lines, the spring is lifted above and out of contact with the nut, and the lower end of the spring is also held out of contact with the push rod, the spring fitting over the neck portion of the sleeve.

What I claim is:—

1. The combination with a valve push rod and a valve lifter lock and a lock nut on the push rod, of a sleeve enclosing said nut and resting on the valve lifter lock, a coil spring encircling the push rod and bearing on said sleeve at one end, and a bearing on the push rod for the opposite end of the spring.

2. In a device of the kind described, the combination with a valve operating rod and a valve lifter lock, of a spring encircling the rod, a bearing for the upper end of the spring, and a sleeve inserted between the lock and the spring and encircling the push rod, said sleeve having a contracted neck portion, the spring passing over said neck portion and bearing on the sleeve, as and for the purpose set forth.

In testimony whereof I affix my signature.

REUBEN G. McCOSKRIE.